United States Patent
Yao et al.

(10) Patent No.: US 12,543,041 B2
(45) Date of Patent: Feb. 3, 2026

(54) CONNECTION AUTHENTICATION SYSTEM AND METHOD

(71) Applicant: Acer Incorporated, New Taipei (TW)

(72) Inventors: Sheng-Hsiung Yao, New Taipei (TW); Ling-Fan Tsao, New Taipei (TW); Yen-Ju Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 114 days.

(21) Appl. No.: 18/731,723

(22) Filed: Jun. 3, 2024

(65) Prior Publication Data

US 2025/0119740 A1    Apr. 10, 2025

(30) Foreign Application Priority Data

Oct. 5, 2023   (TW) ................................ 112138203

(51) Int. Cl.
*H04W 12/08* (2021.01)
*G06F 21/32* (2013.01)
*G06V 40/16* (2022.01)

(52) U.S. Cl.
CPC ............ *H04W 12/08* (2013.01); *G06F 21/32* (2013.01); *G06V 40/16* (2022.01)

(58) Field of Classification Search
CPC ......... H04W 12/08; G06F 21/32; G06V 40/16
See application file for complete search history.

(56) References Cited

U.S. PATENT DOCUMENTS

| 9,652,663 | B2 * | 5/2017 | Lau ...................... G06V 40/168 |
| 10,984,084 | B2 * | 4/2021 | Funayama ............ H04L 9/0866 |
| 11,720,656 | B2 | 8/2023 | Oung |
| 2016/0261601 | A1 * | 9/2016 | Zhou ..................... H04L 63/108 |
| 2020/0294339 | A1 * | 9/2020 | Rao .......................... G07C 9/26 |
| 2020/0366671 | A1 | 11/2020 | Larson |

FOREIGN PATENT DOCUMENTS

| CN | 106060817 A | 10/2016 |
| CN | 111758096 A | 10/2020 |

OTHER PUBLICATIONS

Chinese language office action dated Jun. 26, 2024, issued in application No. TW 112138203.

\* cited by examiner

*Primary Examiner* — Bryan Y Lee
(74) *Attorney, Agent, or Firm* — McClure, Qualey & Rodack, LLP

(57) ABSTRACT

A connection authentication method is provided in the invention. The connection authentication method may comprise the following steps. A master device may provide a white list to a wireless network device, wherein the white list comprises white list information of at least one authorized device. Then, the wireless network device may connect to the at least one authorized device according to the white list to provide network connection to the at least one authorized device.

14 Claims, 5 Drawing Sheets

CONNECTION AUTHENTICATION SYSTEM AND METHOD

CROSS REFERENCE TO RELATED APPLICATIONS

This application claims priority of TW patent application No. 112138203 filed on Oct. 5, 2023, the entirety of which is incorporated by reference herein.

BACKGROUND OF THE INVENTION

Field of the Invention

The invention generally relates to connection authentication technology, and more particularly, to connection authentication technology in which the connection authentication is performed using a white list.

Description of the Related Art

As science and technology continue to progress, the requirements for Wi-Fi applications are increasing.

When friends or clients visit us, they may need to connect to the wireless network device (e.g., Wi-Fi router) to access to the network connection. However, visiting friends or clients cannot connect to the wireless network device until they input the Wi-Fi password. In addition, for security reasons, after the aforementioned friends or clients leave, we may need to change the Wi-Fi password.

Therefore, how to flexibly and safely authenticate friends or clients and allow them to use a wireless network device to access to the network connection is a subject which is worthy of discussion.

BRIEF SUMMARY OF THE INVENTION

A connection authentication method and system are provided to overcome the problems mentioned above.

An embodiment of the invention provides a connection authentication method. The connection authentication method may comprise the following steps. A master device may provide a white list to a wireless network device, wherein the white list comprises white list information of at least one authorized device. Then, the wireless network device may connect to the at least one authorized device according to the white list to provide network connection to the at least one authorized device.

In some embodiments, the white list information may comprise the device name, the device network address and the connection time of each authorized device.

In some embodiments, the connection authentication method may further comprise the following steps. The master device may capture a photo of the user of the authorized device. The master device may obtain at least one feature vector in the photo using a facial recognition model, wherein each feature vector corresponds to a human face. Then, the master device may compare the feature vector and the stored feature vectors to determine whether there are any matching feature vectors.

In some embodiments, when there is a matching feature vector, the master device may automatically set the white list information of the authorized device that corresponds to the matching feature vector.

In some embodiments, when there is no matching feature vector, the master device may capture another photo of the user of the authorized device which does not have matching feature vector. The master device may then obtain a feature vector in this photo using the facial recognition model, and then store the feature vector corresponding to this photo.

In some embodiments, the master device may store device information corresponding to each authorized device.

In some embodiments, the device information may comprise a device name, a device network address, a connection time, a white list suspended time and a final disconnection time corresponding to each authorized device.

In some embodiments, the master device may set the white list suspended time according to the final disconnection time.

In some embodiments, the master device may update and manage the white list information and the device information corresponding to each authorized device.

An embodiment of the invention provides a connection authentication system. The connection authentication system may comprise at least one authorized device, a wireless network device, and a master device. The wireless network device may connect to the at least one authorized device according to a white list to provide network connection to the at least one authorized device. The master device may provide the white list to the wireless network device, wherein the white list comprises white list information of at least one authorized device.

Other aspects and features of the invention will become apparent to those with ordinary skill in the art upon review of the following descriptions of specific embodiments of a connection authentication method and system.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
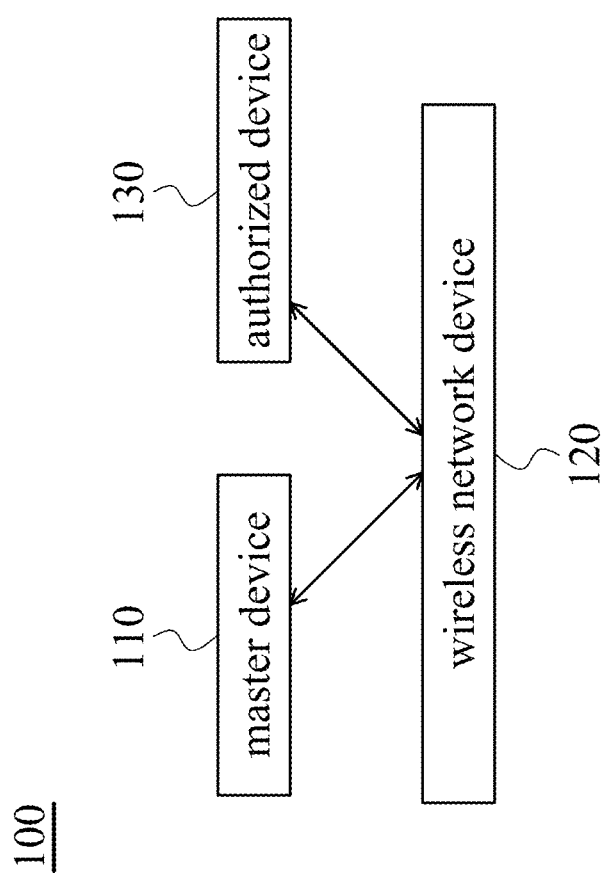
FIG. 1 is a block diagram of a connection authentication system 100 according to an embodiment of the invention.

FIG. 1 is a block diagram of a connection authentication system 100 according to an embodiment of the invention. As shown in FIG. 1, the connection authentication system 100 may comprise a master device 110, a wireless network device 120 and at least one authorized device 130. It should be noted that FIG. 1 presents a simplified block diagram in which only the elements relevant to the invention are shown. However, the invention should not be limited to what is shown in FIG. 1. The connection authentication system 100 may also comprise other elements. For example, the connection authentication system 100 may comprise a plurality of authorized devices 130. According to an embodiment of the invention, the wireless network device 120 may be a router, an internet protocol (IP) sharing device, but the invention should not be limited thereto.

According to an embodiment of the invention, the master device 110 may be a smart phone, a notebook, a desktop computer, but the invention should not be limited thereto. The master device 110 may be configured to set the white list information of the white list which is provided to the wireless network device 120. In an embodiment, the master device 110 may directly establish connection with the wireless network device 120 to provide the white list to the wireless network device 120. In another embodiment, the mater device 110 may remotely control the wireless network device 120, i.e., the mater device 110 may provide the white list to the wireless network device 120 through a remote server.

According to another embodiment of the invention, the connection authentication system 100 may also comprise a plurality of master devices 110. Each master device 110 can perform the operations illustrated in the following embodiments.

According to an embodiment of the invention, the authorized device 130 may be a smart phone, a note book, a tablet, but the invention should not be limited thereto. In the embodiments of the invention, the authorized device 130 may be the device that is allowed to use the network from the wireless network device 120 by the user of the master device 110. When the authorized device 130 is connected to the service set identifier (SSID) of the wireless network device 120, the authorized device 130 only needs to wait for the authentication from the master device 110 without inputting the password. That is, when the wireless network device 120 obtains the white list information corresponding to the authorized device 130 from the master device 110, the authorized device 130 can be authorized to use the network from the wireless network device 120 (i.e., the Wi-Fi connection has been established). In other words, when a device does not corresponding to the white list information in the white list of the wireless network device 120 (i.e., the device has not been authorized by the master device 110), the device may not use the network from the wireless network device 120.

Figure 2:
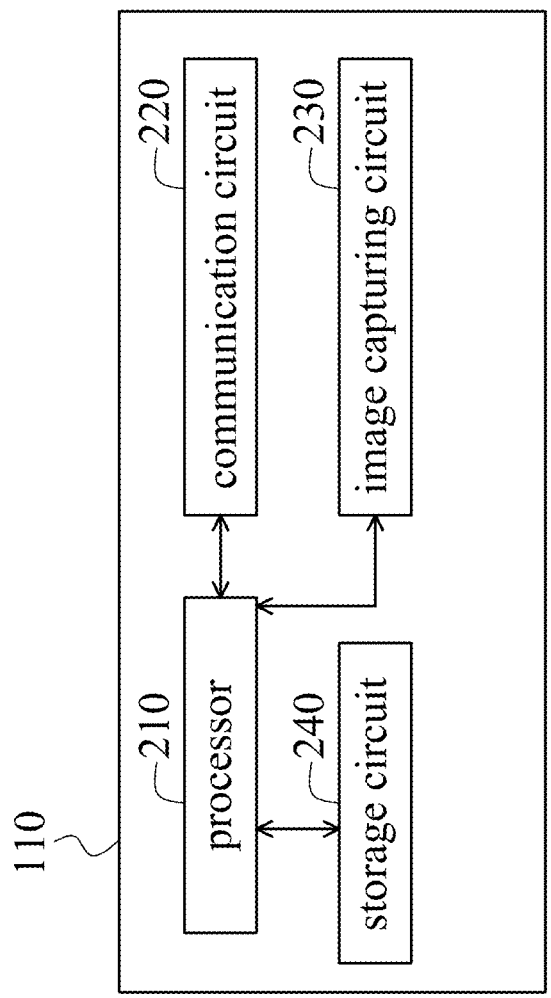
FIG. 2 is a block diagram of a master device 110 according to an embodiment of the invention.

FIG. 2 is a block diagram of a master device 110 according to an embodiment of the invention. As shown in FIG. 2, the master device 110 may comprise a processor 210, a communication circuit 220, an image capturing circuit 230, and a storage circuit 240. It should be noted that FIG. 2 presents a simplified block diagram in which only the elements relevant to the invention are shown. However, the invention should not be limited to what is shown in FIG. 2. The master device 110 may also comprise other elements and circuits.

The processor 210 may be a controller or a processor. The processor 210 may be configured to control the operations of the communication circuit 220, the image capturing circuit 230 and the storage circuit 240. According to an embodiment of the invention, the processor 210 may also perform the program codes of software and firmware the related operations of the connection authentication.

The communication circuit 230 may be configured to establish the connection with wireless network device 120 to provide white list information to the wireless network device 120. The white list information may comprise the device name (e.g., the serial number of the authorized device 130), the device network address (i.e., the media access control (MAC) address of the authorized device 130) and the connection time (i.e., the time point of the authorized device 130 authorized to connect to the wireless network device 120) of each authorized device 130.

The image capturing circuit 230 may be configured to capture the photo of the human face of the user of each authorized device 130, or capture a group photo of the users of a plurality of authorized devices 130.

According to the embodiments of the invention, the storage circuit 240 may store the software and firmware program codes, system data, user data, etc. of the master device 110. The storage circuit 240 may be a volatile memory (e.g. Random Access Memory (RAM)), or a non-volatile memory (e.g. flash memory, Read Only Memory (ROM)), a hard disk, or a combination of the above memory devices. According to an embodiment of the invention, the storage circuit 240 may be configured to store the feature vector and device information of each authorized devices 130.

Figure 3:
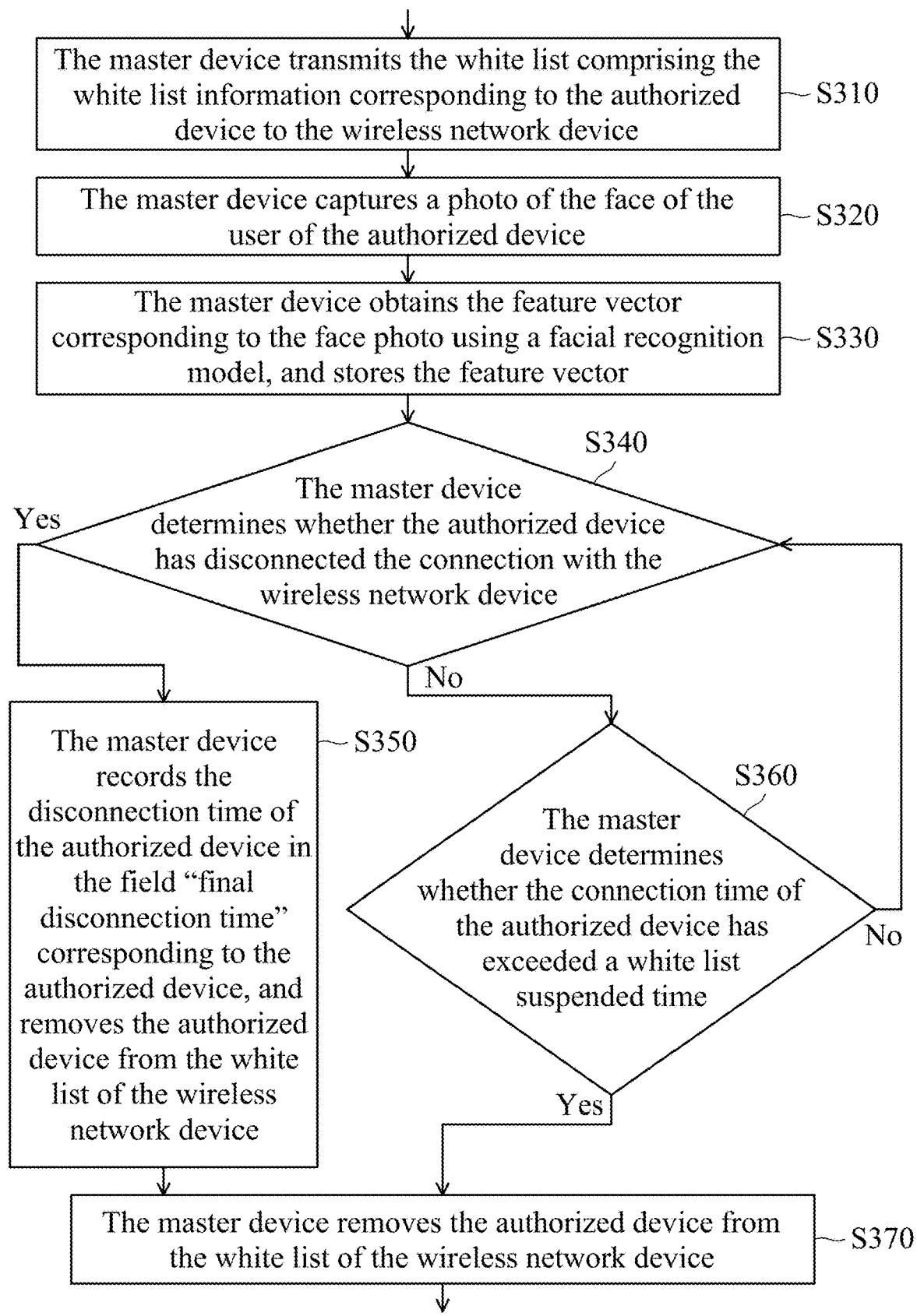
FIG. 3 is a flow chart illustrating an initial connection authentication process according to an embodiment of the invention.

FIG. 3 is a flow chart illustrating an initial connection authentication process according to an embodiment of the invention. The flow chart of FIG. 3 can be applied to the connection authentication system 100. In step S310, when an authorized device is connected to the wireless network device for the first time, the master device may transmit the white list comprising the white list information corresponding to the authorized device to the wireless network device. The white list information may comprise the device name, the device network address and the connection time of the authorized device. Table 1 is an example of the white list, but the invention should not be limited thereto.

TABLE 1

| white list | | |
|---|---|---|
| device name | device network address | connection time |
| iPhone 14 Pro | 00:0A:02:0B:03:0C | Mar. 25, 2023(Saturday) 11:13 |

In step S320, the master device may capture a photo of the human face of the user of the authorized device.

In step S330, the master device may obtain the feature vector corresponding to the face photo using a facial recognition model, and store the feature vector. The feature vector may be associated with the device network address corresponding to the authorized device.

Specifically, the facial recognition model may be a facial recognition model which is previously trained through one or more facial recognition algorithms (e.g., multi-task cascade convolutional networks (MTCNN), Facenet, Face-Alignment, but the invention should not be limited thereto). For example, 10 photos corresponding to different angles for 1000 persons (i.e., 10000 photos) may be used to establish the facial recognition model. Firstly, the front photo of each person may be used to establish feature point database. Specifically, the MTCNN may be used to frame out the face of each person first. Then, the Facenet may be used to extract the features of the face, split the face into the matrix with several dimensions (e.g., the data for the length and width of the nose, the width of the forehead, the length and shape of the eyes, and the distance between the eyes may be extracted and transformed into vector-based features), and store the features in the database. Then, the photos corresponding to other angles of each person may be used to train the facial recognition model. Specifically, the faces in these photos may be framed out, and then the Face-Alignment may be used to align the faces in these photos, and input these photos to the facial recognition model to extract the feature data to obtain the feature vectors corresponding to these photos. Then, the Euclidean distance may be used to compare the similarity between the photos and the data in the database. A threshold may be set to determine whether the face in the photo and the face in the data of the database correspond to the same person.

In addition, according to an embodiment of the invention, the master device may store the device information corresponding to each authorized device. Device information may comprise the device name, the device network address, the connection time, the white list suspended time, and the final disconnection time of each authorized device. Because an authorized device is authorized for the first time, the master device may determine the white list suspended time according to the connection time corresponding to the authorized device. For example, if the connection time corresponding to the authorized device is 2023 Mar. 25 11:13, the mater device may set the white list suspended time to 2023 Mar. 26 11:13 (e.g., 24 hours, but the invention should not be limited thereto). In addition, because this authorized device is being authorized for the first time, the authorized device does not have a final disconnection time.

Table 2 shows an example of the device information corresponding to the flow of FIG. 3, but the invention should not be limited thereto.

TABLE 2

| | | device information | | |
|---|---|---|---|---|
| device name | device network address | photo model has been established | white list suspended time | final disconnection time |
| iPhone 14 Pro | 00:0A:02:0B:03:0C | Yes | Mar. 25, 2023(Saturday) 11:13 | |

In step S340, the master device may determine whether the authorized device has disconnected the connection with the wireless network device (i.e., the Wi-Fi connection has been disconnected)

If the authorized device has disconnected the connection with the wireless network device, step S350 is performed. In step S350, the master device may record the disconnection time of the authorized device in the field "final disconnection time" corresponding to the authorized device, and remove the authorized device from the white list of the wireless network device.

If the authorized device has not disconnected the connection with the wireless network device, step S360 is performed. In step S360, the master device may determine whether the connection time of the authorized device has exceeded a white list suspended time.

If the connection time of the authorized device has exceeded the white list suspended time, step S370 is performed. In step S370, the master device may remove the authorized device from the white list of the wireless network device.

If the connection time of the authorized device has not exceeded the white list suspended time, the flow backs to step S340.

Figure 4:
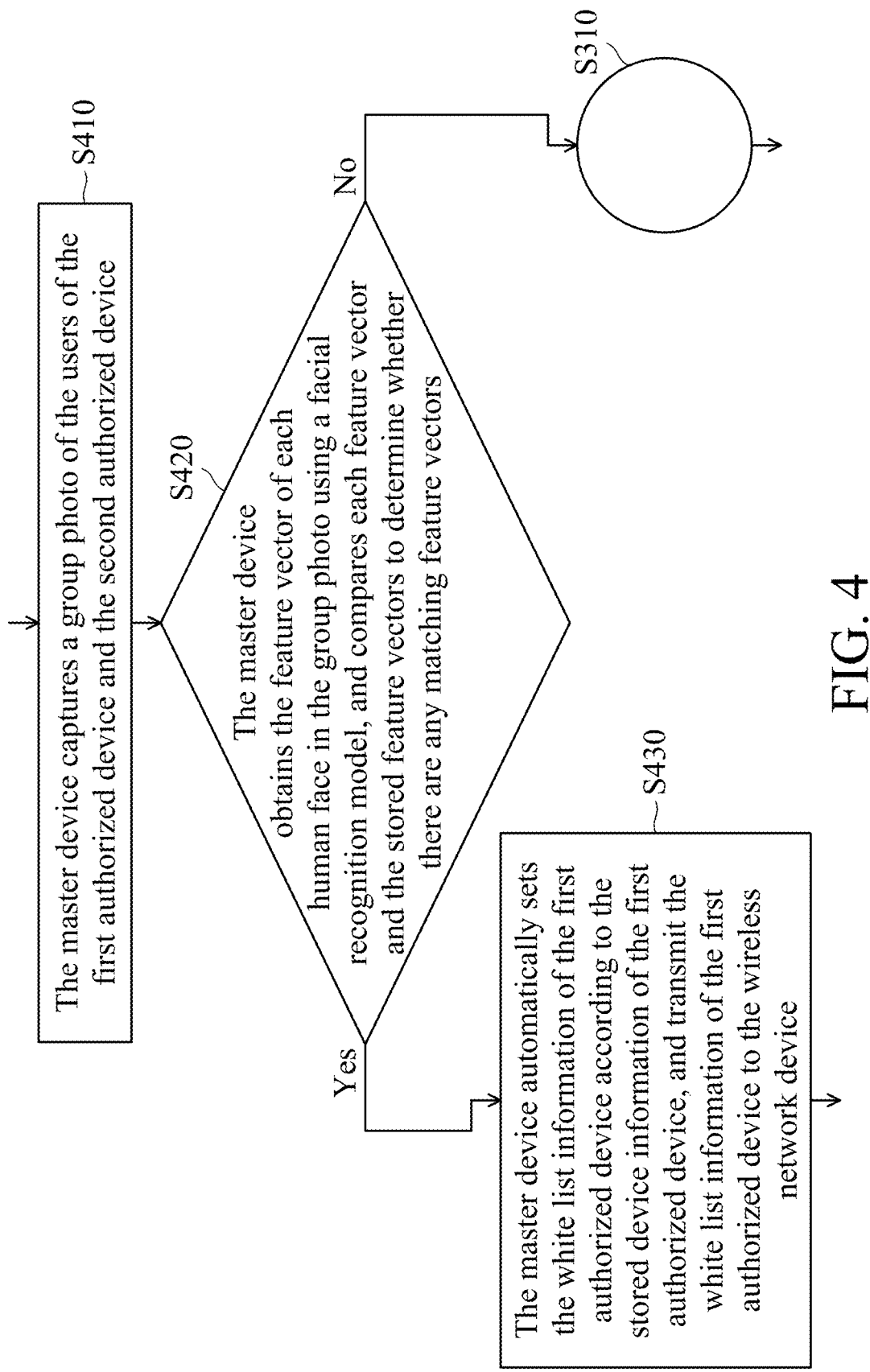
FIG. 4 is a flow chart illustrating a connection authentication process according to an embodiment of the invention.

FIG. 4 is a flow chart illustrating a connection authentication process according to an embodiment of the invention. The flow chart of FIG. 4 can be applied to the connection authentication system 100. It should be noted that the first authorized device and the second authorized device are used to illustrate the FIG. 4, but the invention should not be limited thereto. In step S410, when a first authorized device and a second authorized device need to be authorized to connect to the wireless network device, the master device may capture a group photo of the users of the first authorized device and the second authorized device.

In step S420, the master device may obtain the feature vector of each human face in the group photo using a facial recognition model, and compare each feature vector and the stored feature vectors to determine whether there are any matching feature vectors.

If there is a matching feature vector (e.g., the feature vector corresponding to the first authorized device has the matching feature vector, i.e., the first authorized device has been authorized before), step S340 is performed. In step S340, the master device may automatically set the white list information of the first authorized device according to the stored device information of the first authorized device, and transmit the white list information of the first authorized device to the wireless network device to authorize the first authorized device to connect the network connection through the wireless network device. In addition, the master device may also set the white list suspended time corresponding to the first authorized device for this connection according to the prior final disconnection time corresponding to the first authorized device.

If there is no matching feature vector (e.g., the feature vector corresponding to the second authorized device is being authorized for the first time), the master device may capture the face photo of the user of the second authorized device, and perform the operations as shown in FIG. 3.

TABLE 3

| | white list | |
|---|---|---|
| device name | device network address | connection time |
| iPhone 14 Pro | 00:0A:02:0B:03:0C | May 20, 2023(Saturday) 10:30 |
| Google Pixel 6 | 00:B0:D0:63:C2:26 | May 20, 2023(Saturday) 10:38 |

TABLE 4

| | | device information | | |
|---|---|---|---|---|
| device name | device network address | photo model has been established | white list suspended time | final disconnection time |
| iPhone 14 Pro | 00:0A:02:0B:03:0C | Yes | May 20, 2023(Saturday) 17:47 | Mar. 25, 2023(Saturday) 16:47 |
| Google Pixel 6 | 00:B0:D0:63:C2:26 | Yes | May 21, 2023(Saturday) 10:38 | |

Table 3 and Table 4 respectively show the examples of the white list and the device information corresponding to the flow of FIG. 4, but the invention should not be limited thereto. Because the first authorized device has been authorized before, the master device set the white list suspended time corresponding to the first authorized device according to the recorded final disconnection time (16:47) of the first authorized device to set the white list suspended time corresponding to the first authorized device. As shown in Table 4, the white list suspended time corresponding to the first authorized device is the prior final disconnection time corresponding to the first authorized device plus 1 hour (i.e., 16:47+1=17:47), but the invention should not be limited thereto. In addition, because the second authorized device is being authorized for the first time, the master device may determine the white list suspended time corresponding to the second authorized device according to the connection time that corresponds to the second authorized device. As shown in FIG. 4, if the connection time corresponding to the second authorized device is 2023 May 20 (Saturday) 10:38, the master device may set the white list suspended time corresponding to the second authorized device to 2023 May 21 (Saturday) 10:38 (i.e., 24 hours, but the invention should not be limited thereto).

According to another embodiment of the invention, the master device also set the white list suspended time corresponding to an authorized device according multiple times of final disconnection time corresponding to the authorized device. For example, if the final disconnection time before last final disconnection time corresponding to an authorized device is 17:35, and the last final disconnection time corresponding to an authorized device is 18:35, the master device may average the two final disconnection time and add 1 hour (i.e., 17.35+18:35/2=17.53, 17.53+1=18:53), but the invention should not be limited thereto. In addition, the master device may set and adjust the white list suspended time corresponding to an authorized device according to holiday or weekday.

According to an embodiment of the invention, the master device may update and manage the white list information and device information corresponding to each authorized device. In an example, if an authorized device has not connected to the wireless network device over a default time (e.g., 1 year), the master device may remove the all or partial device information corresponding the authorized device. In another example, if an authorized device has not connected to the wireless network device over a default times (e.g., 5 times, i.e., the authorized device has connected to the wireless network device 5 times), the master device may remove partial older device information corresponding the authorized device (e.g., remove the oldest device information).

Figure 5:
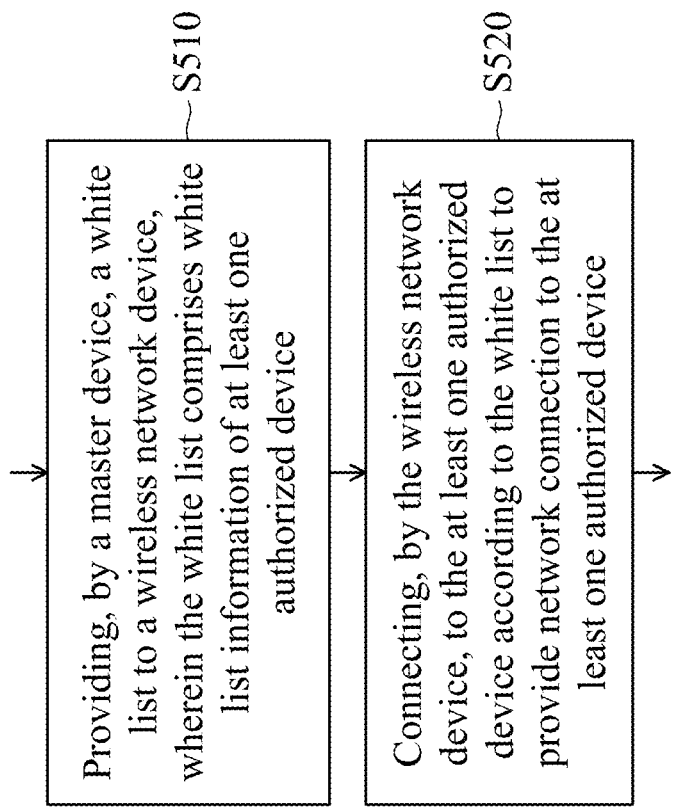
FIG. 5 is a flow chart illustrating a connection authentication method according to an embodiment of the invention.

FIG. 5 is a flow chart illustrating a connection authentication method according to an embodiment of the invention.

The flow of FIG. 5 can be applied to the connection authentication system 100. As shown in FIG. 5, in step S510, the master device 110 may provide a white list to the wireless network device 120, wherein the white list comprises the white list information of at least one authorized device 130.

In S520, the wireless network device 120 may connect to at least one authorized device 130 according to the white list to provide network connection to the at least one authorized device 130.

According to an embodiment of the invention, in the connection authentication method, the white list information comprises the device name, the device network address and the connection time of each authorized device 130.

According to an embodiment of the invention, in the connection authentication method, the master device 110 may further capture a photo of the user of each authorized device 130. The master device 110 may further obtain at least one feature vector in the photo according to a facial recognition model, wherein each feature vector may be corresponded to a human face. The master device 110 may further compare each feature vector and the stored feature vectors to determine whether there are any matching feature vectors.

According to an embodiment of the invention, in the connection authentication method, when there is a matching feature vector, the master device 110 may automatically set the white list information of the authorized device 130 corresponding to the matching feature vector.

According to an embodiment of the invention, in the connection authentication method, when there is no matching feature vector, the master device 110 may capture another photo of the user of the authorized device 130 which does not have a matching feature vector. The master device 110 may then obtain a feature vector in this photo according to the facial recognition model, and store the feature vector corresponding to this photo.

According to an embodiment of the invention, in the connection authentication method, the master device 110 may store the device information corresponding to each authorized device 130. According to an embodiment of the invention, in the connection authentication method, the device information may comprise a device name, a device network address, a connection time, a white list suspended time and a final disconnection time, corresponding to each authorized device 130.

According to an embodiment of the invention, in the connection authentication method, the master device 110 may set the white list suspended time according to the final disconnection time.

According to an embodiment of the invention, in the connection authentication method, the master device 110 may update and manage the white list information and the device information corresponding to each authorized device 130.

According to the connection authentication method provided in the invention, the facial recognition method is used to authorize the authorized device to connect to the network connection through the wireless network device without inputting password for authentication. In addition, the user may not need to change the Wi-Fi password frequently for security concern.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A connection authentication method, comprising:
   providing, by a master device, a white list to a wireless network device, wherein the white list comprises white list information of at least one authorized device;
   connecting, by the wireless network device, to the at least one authorized device according to the white list to provide network connection to the at least one authorized device;
   capturing, by the master device, a photo of a user of the at least one authorized device
   obtaining, by the master device, at least one feature vector in the photo according to a facial recognition model, wherein each feature vector corresponds to a human face;
   comparing, by the master device, the at least one feature vector and stored feature vectors to determine whether there are any matching feature vectors;
   when there is no matching feature vector,
   capturing, by the master device, another photo of the user of the authorized device which does not have a matching feature vector;
   obtaining, by the master device, a feature vector in the another photo according to the facial recognition model; and
   storing, by the master device, the feature vector corresponding to the another photo.

2. The connection authentication method of claim 1, wherein the white list information comprises a device name, a device network address and a connection time corresponding to each authorized device.

3. The connection authentication method of claim 1, further comprising: when there is a matching feature vector, automatically setting, by the master device, the white list information of the authorized device that corresponds to the matching feature vector.

4. The connection authentication method of claim 1, further comprising: storing, by the master device, the device Information corresponding to each authorized device.

5. The connection authentication method of claim 4, wherein the device information comprises a device name, a device network address, a connection time, a white list suspended time and a final disconnection time corresponding to each authorized device.

6. The connection authentication method of claim 5, further comprising: setting, by the master device, the white list suspended time according to the final disconnection time.

7. The connection authentication method of claim 4, further comprising: updating and managing, by the master device, the white list information and the device information corresponding to each authorized device.

8. A connection authentication system, comprising:
   at least one authorized device;
   a wireless network device, connecting to the at least one authorized device according to a white list to provide network connection to the at least one authorized device; and
   a master device, providing the white list to the wireless network device, wherein the white list comprises white list information of at least one authorized device,
   wherein the master device captures a photo of a user of the at least one authorized device, obtains at least one feature vector in the photo according to a facial recognition model, and
   compares the at least one feature vector and stored feature vectors to determine whether there are any r hatching feature vectors, wherein each f ure vector corresponds to a human face,
   wherein when there is no matching feature vector,
   the master device captures another photo of the user of the authorized device which does not have a matching feature vector, obtains a feature vector in the another photo according to the facial recognition model, and stores the feature vector corresponding to the another photo.

9. The connection authentication system of claim 8, wherein the white list information comprises a device name, a device network address and a connection time corresponding to each authorized device.

10. The connection authentication system of claim 8, wherein when there is a matching feature vector, the master device automatically sets the white list information of the authorized device corresponding to the matching feature vector.

11. The connection authentication system of claim 8, wherein the master device stores the device information corresponding to each authorized device.

12. The connection authentication system of claim 11, wherein the device information comprises a device name, a device network address, a connection time, a white list suspended time and a final disconnection time corresponding to each authorized device.

13. The connection authentication system of claim 12, wherein the master device sets the white list suspended time according to the final disconnection time.

14. The connection authentication system of claim 11, wherein the master device updates and manages the white list information and the device information corresponding to each authorized device.

\* \* \* \* \*